No. 658,562. Patented Sept. 25, 1900.
L. A. ASPINWALL.
POTATO PLANTER.
(Application filed Jan. 29, 1900.)
(No Model.) 4 Sheets—Sheet 2.
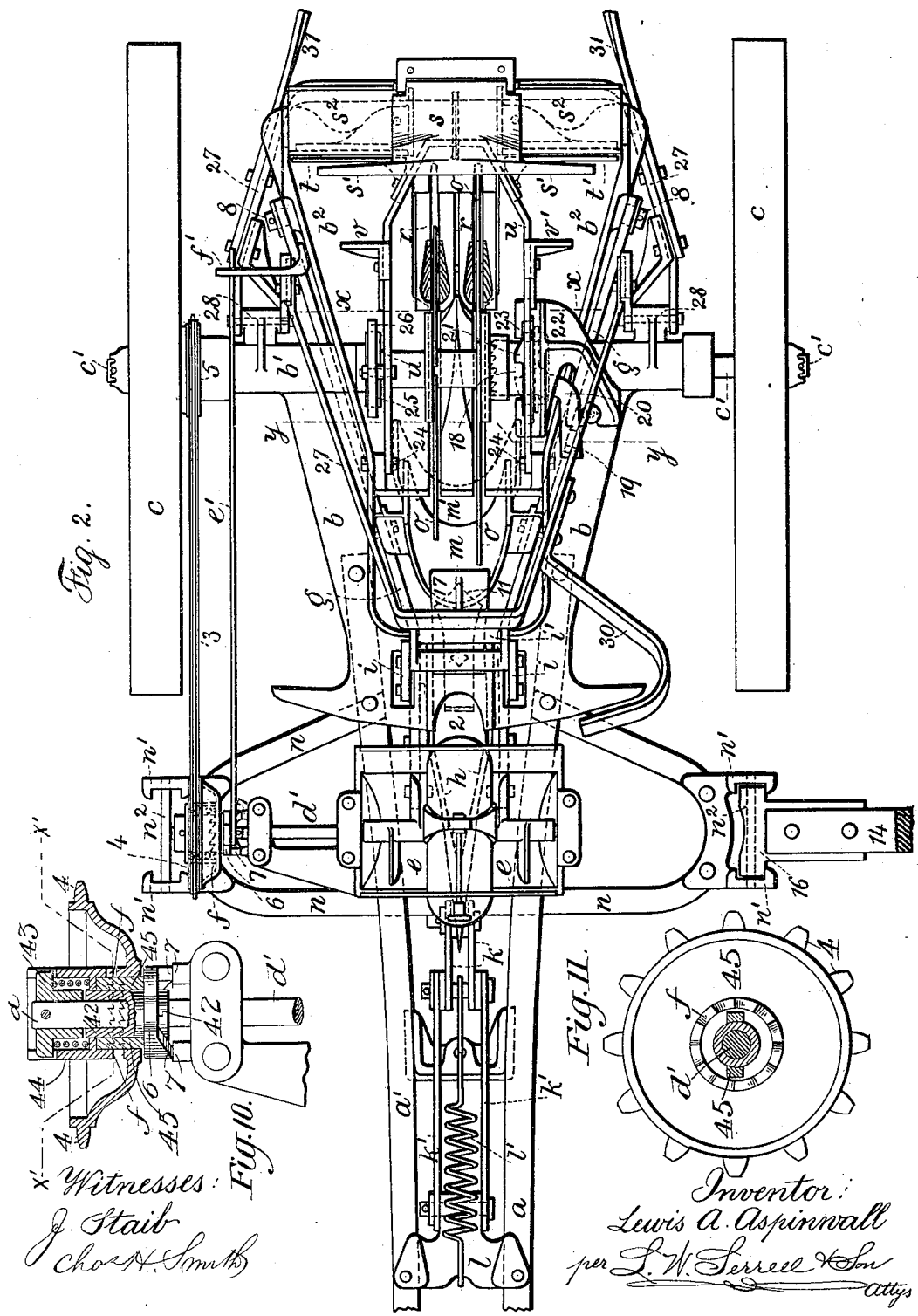

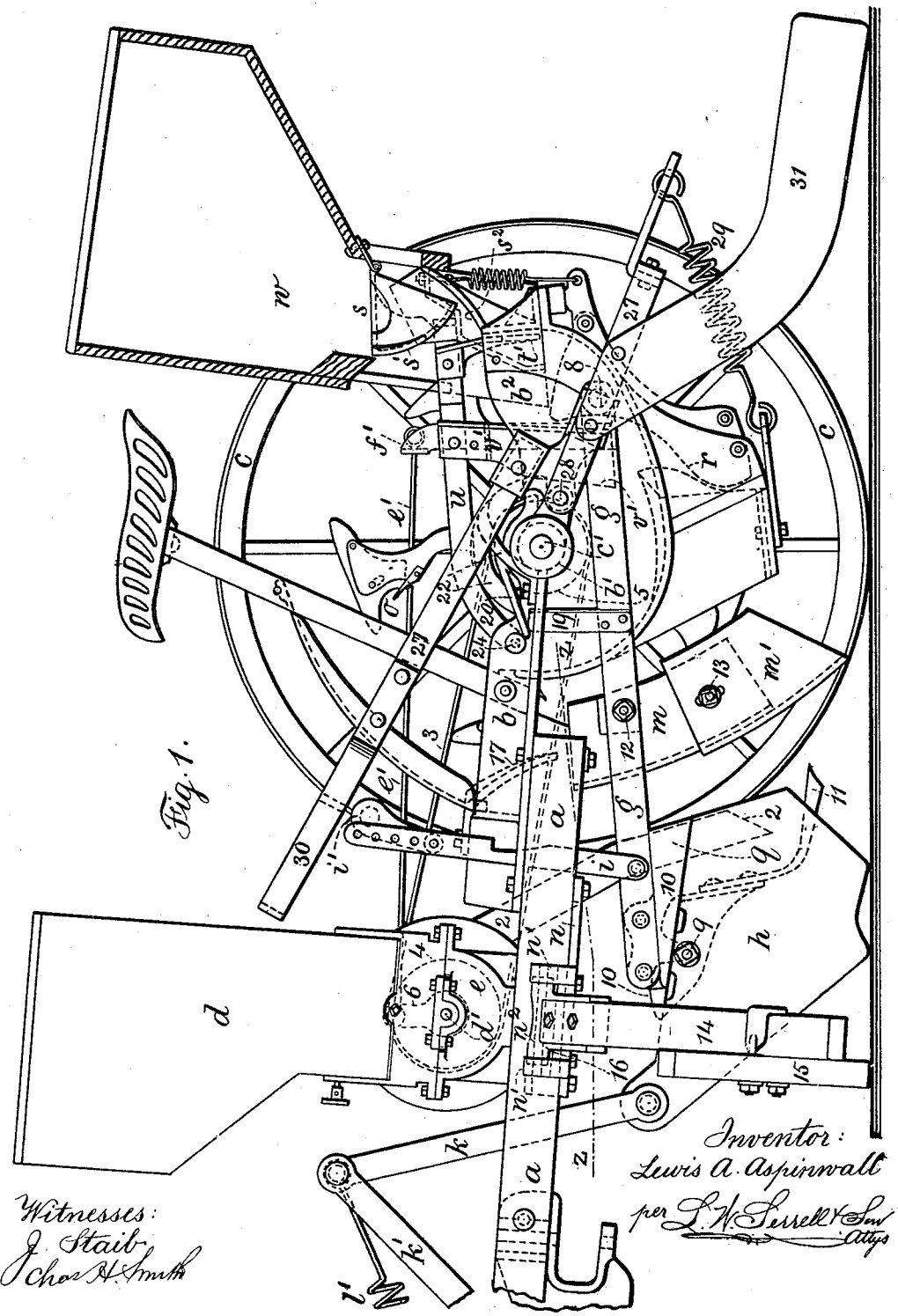

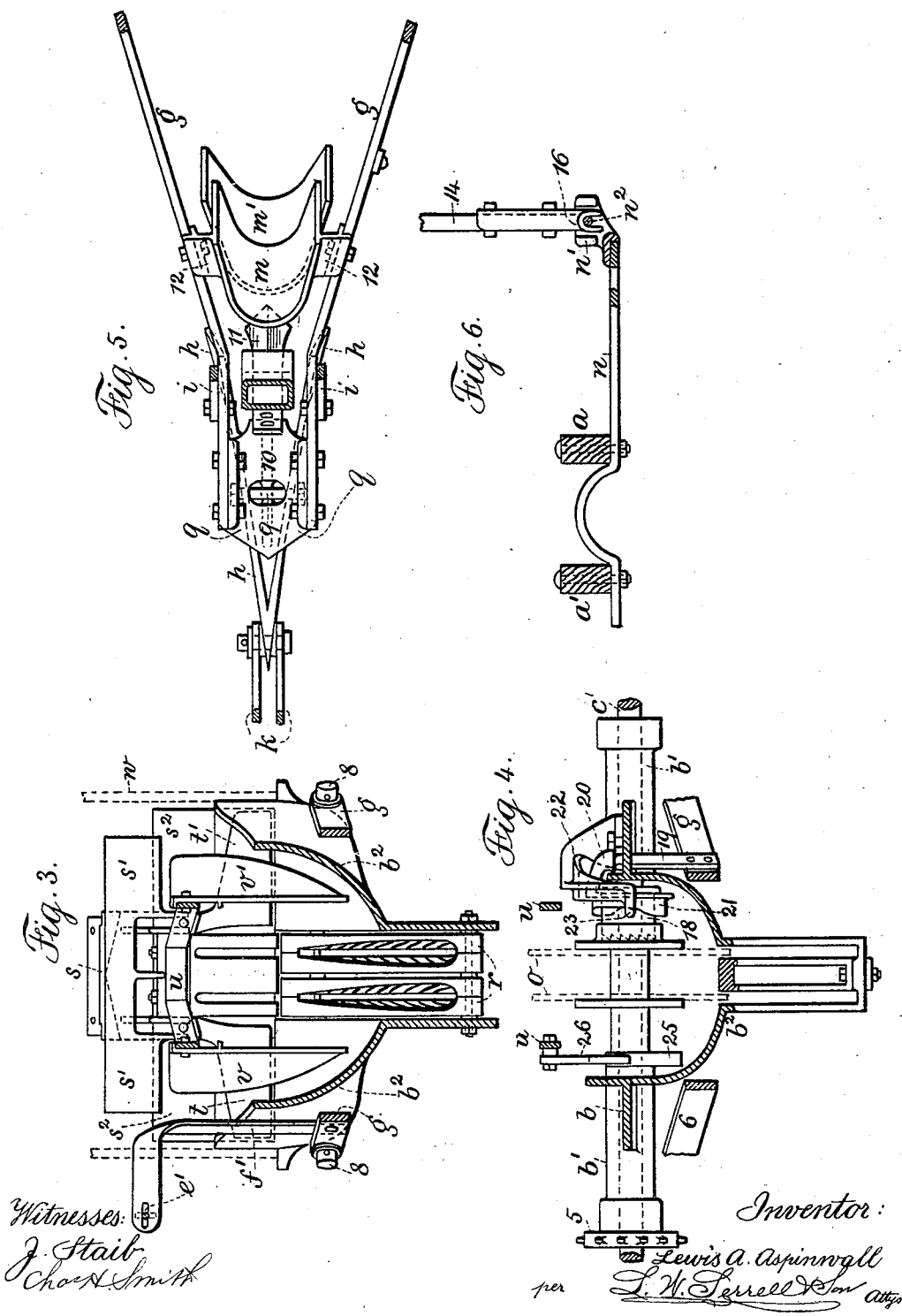

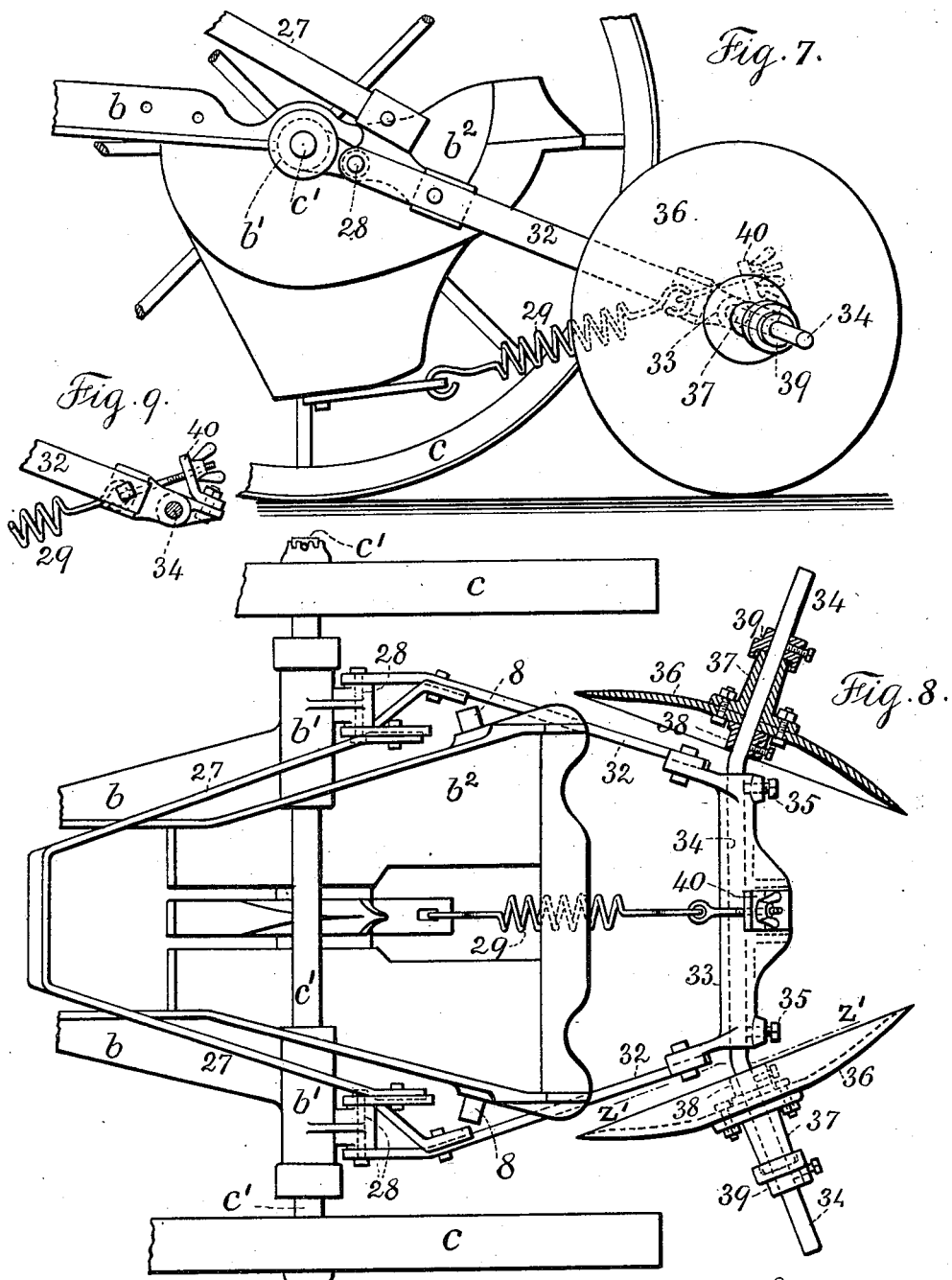

UNITED STATES PATENT OFFICE.

LEWIS AUGUSTUS ASPINWALL, OF JACKSON, MICHIGAN, ASSIGNOR TO THE ASPINWALL MANUFACTURING COMPANY, OF SAME PLACE.

POTATO-PLANTER.

SPECIFICATION forming part of Letters Patent No. 658,562, dated September 25, 1900.

Application filed January 29, 1900. Serial No. 3,085. (No model.)

*To all whom it may concern:*

Be it known that I, LEWIS AUGUSTUS ASPINWALL, a citizen of the United States, residing at Jackson, in the county of Jackson and State of Michigan, have invented an Improvement in Potato-Planters, of which the following is a specification.

My present invention relates to improvements upon the devices shown and described in the following Letters Patent heretofore granted to me: No. 235,401, dated December 14, 1880; No. 276,994, dated May 8, 1883; No. 342,491, dated May 25, 1886; and No. 529,099, dated November 13, 1894. The devices of the aforesaid patents relate to various improvements in potato-planters, the same showing the advancing stages of improvement in this art made necessary by the various conditions of use arising from time to time. While many of the said devices were more or less ineffectual, some of the more advantageous features of these devices are retained in the present improvement, the design of which is to obviate the difficulties experienced in the aforesaid devices and to group in one machine all of the various means required for the automatic and successful planting of potatoes by machinery.

In carrying out my invention I make use of a divided pole to the planter, thereby making provision for the fertilizer attachment in advance of the potato-planting mechanism; also, so that the fertilizer is discharged back of the plow and after the furrow in the soil has been opened previous to dropping the potatoes into the furrow. The plow is provided with an attachment for spreading the fertilizer as discharged and for assisting in mixing the same with the soil in the furrow.

To aid the operator in lifting the plow, I employ a spring-actuated device, and I make use of an improved method of attaching the marker to guide the driver in making the adjacent furrows, which improvement provides for immediately removing the marker from one side and connecting the same to the other side of the planter. This attachment is in front of the wheels and in such a position that the parts of the planter do not have to be added to or extended to provide a bearing for the marking device.

The chute through which the potatoes are delivered is provided with an adjustable bottom piece, the action of which is to partly reopen the furrow into which the fertilizer has been discharged and to deliver the potatoes at the base of the new furrow in loose soil, the fertilizer being underneath. I provide means actuated by lifting the plow for throwing the fertilizer attachment and potato-planting mechanism out of gear. This automatic arrangement provides against any failure of the operator to throw same in gear when starting the machine in each row. The hopper for holding the supply of potatoes is located at the rear of the machine and contains an agitator with edge guides, adjacent to which are gates connected to a pivoted frame and a cam for lifting the same every revolution of the driving-wheels, so that the potatoes are properly and progressively fed, and I also provide devices in the frame or magazine for receiving the potatoes, which are raised by the accumulation of potatoes to effect the operation of this gate.

At the rear of the machine and below the hopper for holding the potatoes I place hinged coverers, also springs for drawing the coverers down, which allow the same to yield to obstructions and inequalities in the ground, and I also make use of devices by which these coverers are raised by foot-pressure and hooked into place by lifting the plow, the two being connected so that when the coverers are out of the ground (when moving the planter from place to place) the plow is raised also.

In the drawings, Figure 1 is a side elevation, and Fig. 2 a plan view, representing my improved potato-planter with the hoppers for fertilizer and potatoes removed. Fig. 3 is a cross-section and rearward elevation at about the line $x\ x$ of Fig. 2. Fig. 4 is a cross-section and rearward elevation at about the line $y\ y$ of Fig. 2. Fig. 5 is a sectional plan at about the line $z\ z$ of Fig. 1. Fig. 6 is a cross-section through the divided pole and frame carrying the attachment for the marker. Fig. 7 is a side elevation, and Fig. 8 a plan, representing a modified form of coverer for deep covering; and Fig. 9 is a cross-section at $z'\ z'$ of Fig. 8. Fig. 10 is a sectional plan; and Fig. 11, an end view at the line $x'\ x'$ of Fig.

10, showing in larger size the means for bringing into operation the fertilizer-distributing devices.

I will herein aim to describe the various parts in the order hereinbefore stated.

The divided pole $a\ a'$ is secured to both sides of the frame $b$. The frame $b$, the sleeve $b'$, and the magazine or hopper $b^2$ are preferably all made of a single casting for strength and for attachment thereto of other and movable parts of the machine. The wheels $c$ are mounted on an axle $c'$, passing through the sleeve $b'$ and across the magazine or frame $b^2$. The fertilizer-hopper $d$ and iron shell are supported by the divided pole, and the fertilizer-distributing device, while immaterial to the present application in its details, is preferably made the same as the device described in my Patent of November 13, 1894, No. 529,099.

The fertilizer is placed in the hopper $d$ and passes down through the devices $e$ and is delivered from the chute 2. These devices are operated by a band or endless chain 3, running around sprockets 4 and 5, the one being upon the main axle and the other upon the shaft of the devices. To actuate these devices so that their operation may be simultaneous with the operations of the other parts of the planter, I make use of a rod $e'$, a clutch $f$, and an arm $f'$, which arm $f'$ is connected to the plow-frame $g$ at the rear end thereof. Upon the shaft $d'$ of the fertilizer attachment there is a lever 6, to which the rod $e'$ is connected, and oppositely-placed cam-faces 7 are provided upon the lever and upon the adjacent stationary portion of the frame. (See Fig. 10.) The sprocket 4, carrying part of the teeth of the clutch $f$, is secured to a sleeve 42, loose around the shaft $d'$ and within the ring carrying the cam-faces 7. To the end of the shaft $b'$ is secured a sleeve with cross-arms 43, bearing in the notched ends of a hub 44, the inner end of said hub 44 having part of the teeth of the clutch $f$, there being a helical spring within the hub 44, bearing upon a flange made therewith and upon the arms 43. Slide-bars 45 occupy opposite openings in the sprocket 4 and move over the surface of the sleeve 42. In the position Fig. 10 the parts are disengaged. When the plow is lowered and the rearward strain on the rod $e'$ is released, the spring within the hub 44 acts on the slide-bars 45 to return the cam-faces 7 to a normal position and permit the teeth of the clutch $f$ to engage, so that the movement of the sprockets and chain sets in motion the fertilizer-distributing devices to deliver the fertilizer while the machine is in operation.

The plow-frame $g$ is pivoted at 8 at its rear end to a stationary part of the main frame, and the plow $h$ is supported at and connected to the forward end of said frame by a casting 10, bolted to the forward end of the plow-frame and having integral tapering overhanging flanges $q$ resting along the upper edges of the plow and coming between the plow and the frame $g$, and a bolt 9 passes through the casting and the plow. Lifter-bars $i$ extend upward and are pivoted at their lower ends to the plow-frame, and a handle $i'$ is provided at their upper ends, the height of which is adjustable in its relation to the depth of planting. To the forward end of the plow a pair of links $k$ is pivoted, and a pair of links $k'$ is pivoted at one end to the pair of links $k$ and at the other end to the frame $l$, connected to the divided pole, and a spring $l'$ of helical form is at one end hooked over the frame $l$ and at the other end over the pivot-bar connecting the pairs of links $k\ k'$, the action of the spring being to draw the pairs of links upward, swinging on their fixed pivot at the frame $l$, this movement assisting the operator in raising the weight of the plow.

The plow is of V form in plan, and the same is suspended by the bolt 9 from the casting 10 and the plow-frame $g$, and the casting 10, connected to the plow-frame, carries a spreader 11, extending rearward and downward, so as to spread the fertilizer as the same falls upon the rounded upper surface of the spreader and, running over the same, mixes with the earth as the spreader acts thereon. The potato-chute is in two parts, an upper part $m$, connected by brackets and fastening devices 12 to the plow-frame, and a lower portion $m'$, larger than the portion $m$ and fitting around the same and connected thereto by the mortises and bolts 13, which provide for the vertical adjustment of the part $m'$ in its relation to the part $m$. The lower point of the chute $m'$ assists in reopening the furrow to properly receive the potatoes. The marker-bar 14 is provided with a cross-bar 15, adapted to come into actual contact with the ground to mark for the adjacent furrow, and I provide a frame $n$ of practically a loop form, which extends around beneath the fertilizer devices and connected to the divided pole. The projecting ends of this frame $n$ carry forked lugs $n'$, oppositely placed and provided with a cross-pin $n^2$, (shown in Figs. 2 and 6,) and the marker-bar 14 is connected to a U-shaped head 16. In connecting the marker-bar to the forked lugs the same is placed between the lugs in the vertical position over the cross-pin $n^2$, (shown in Fig. 6,) wherein the U-head straddles the pin in said lugs, and the marker-bar is then turned outward and downward, so as to bring the ends of the U-head between the forked portions of the lugs, whereby the head cannot be removed until the marker-bar is again brought into an elevated position. This device is readily connected and disconnected upon either side of the machine.

The pickers $o$ and the two slotted concaves $r$ in the hopper $b^2$ by means of which the potatoes are separately engaged and removed one at a time from the hopper for delivery are similar to the devices shown in my patents hereinbefore stated, No. 235,401, of December 14, 1880, and No. 276,994, of May 8, 1883, and I use in connection therewith a cam 17 for tripping the pickers to release the potatoes, so that the same are delivered through the chutes $m$ $m'$ into the ground. These pickers $o$ are connected to disks upon a central sleeve surrounding the shaft $c'$, as in my aforesaid patents, and I make use of means for automatically throwing these pickers into and out of gear. This means comprises a clutch-sleeve 18 upon the shaft $c'$, which sleeve is provided with a flange at the right-hand side, as seen in Fig. 4, and around this clutch-sleeve is another sleeve 21, having a cam edge and a flange, the flange being integral with the arm 20, the free end of which comes above the bar 19, connected to and projecting above the plow-frame $g$.

A bracket-arm 22 is connected to the frame $b$ of the machine, and this extends over the arm 20 and forward of the cam-surface of the sleeve 21, where there is a projecting finger 23, bearing upon the surface of the cam. In the operation of these parts when the plow-frame is raised the bar 19 lifts the arm 20, giving a partial rotation to the sleeve 21. In this partial rotation the cam-face of the sleeve 21, bearing against the finger 23, imparts a longitudinal movement to the clutch-sleeve 18, which disengages the clutch, so that the pickers are left free.

The potato-hopper $w$ at the rear of the machine is contracted at the lower portion, and at this portion I provide an agitator pivoted to the hopper, as shown in Fig. 1, and this agitator is provided with edge guides $s'$, extending transversely, more or less, as desired, toward the sides of the hopper, and beneath the agitators $s$ are inclines $s^2$, the potatoes falling over the edges of the agitator upon and passing down the incline.

A frame $u$, like a yoke in plan, is pivoted at 24 to the frame $b$ of the machine, and the rear or bow end of this frame is supported upon part of the frame of the machine, and near this rear end there are gates $t$ $t'$, coming at the lower edge of the inclines $s^2$, and the agitator $s$ rests upon the bow end of this frame $u$, and I provide a cam 25 upon the axle $c'$, as in my Patent No. 276,994, and a yoke 26 on the frame $u$, the yoke fitting over the cam and, with the frame $u$, being raised every revolution of the cam. This elevation of the frame $u$ also raises the gates $t$ $t'$ and at the same time elevates the footpieces $v$ $v'$, which are also fastened to the frame $u$ upon the opposite sides and forward of the position occupied by the gates. These devices control the feed of the potatoes to the two slotted concaves $r$ and the pickers $o$ in the following manner.

As the magazine or hopper becomes filled with potatoes the eccentric movement of the cam elevates the frame $u$ with footpieces $v$ $v'$, and the gates being raised above the lower edges of the inclines $s^2$ serve to keep back the supply of potatoes. This operation is effected by the action of the cam 25 with every revolution of the wheel, the object being to keep the magazine and the concaves sufficiently full of potatoes to insure one being engaged by the pickers as they revolve in their given paths.

I provide at the rear of the planter and beneath the hopper for potatoes a yoke-frame 27, pivoted at 28 to brackets upon the frame of the machine and close to the axle. This yoke-frame carries the coverers or blades 31, which are curved downward and rearward toward the longitudinal center of the machine, and I provide a helical spring 29, connected to a fixed arm or band at the bottom of the hopper and also to a prolongation or arm from the yoke 27, the tendency of which spring is to draw down the coverers or blades, pressing the same into the soil.

A foot-lever 30 is connected at its rear end to the yoke-frame 27, and at its forward end is adapted to be pressed upon by the foot of the operator, so as to lift the yoke-frame against the action of the spring 29, and when the same is sufficiently elevated it may be engaged with the hook of the lifter $i$ of the plow. Thus when the plow is being lifted its elevation is assisted by the spring $l'$, and by the fact that the foot-lever 30 is engaged with the hook of the said lifter and simultaneously with this position the devices operating the fertilizer are disengaged by means of the rod $e'$, and the clutch engaging the pickers is moved out of action, so that the operative parts of the machine are in a complete state of rest while the planter may be moved from place to place.

In the modification Figs. 7 to 9, inclusive, I have shown a form of coverer and support therefor. These coverers are in the form of rotatable disks 36, having connected sleeves 37, mounted upon the ends of an axle 34, upon which also are collars 38 39, adjustable upon the ends of said axle 34, and between which the coverer disks and sleeves rotate in use. These collars adjustably fix the position of the disk coverers to provide for properly spacing the disks apart. The axle 34 passes through a cross-head 33, and the cross-head is bolted to the ends of the pivoted bars 32, connected to the yoke-frame 27. These bars 32 and the modified devices may be disconnected from the yoke-frame 27 and be replaced by the devices connecting the blades 31.

The edges or rims of the disk coverers 36, as shown, are substantially parallel with the bars 32. The axle 34 is bent where it leaves the cross-head 33, and bolts 35 clamp the said axle adjustably to the said cross-head.

The bent axle may be swung up or down to vary the inclination or angle of the disk coverers 36 to the longitudinal center of the machine to cause them to dig deeper or shallower.

The spacing of the disk-coverers nearer together or farther apart is necessary to provide for fully covering the potatoes to the desired depth. The disk-coverers are interchangeable with the blade coverers 31.

A tang-plate 40, connected centrally to the cross-head 33, receives the adjustable eyebolt end of the spring 29, the office of which is to draw down the disk-coverers.

I claim as my invention—

1. The combination in a potato-planter with a hopper for a fertilizer and means for delivering the same, of a divided pole and means for attaching the fertilizer devices to the pole so that the same come between and over the two parts of the pole and the fertilizer is delivered to the furrow in the longitudinal center of the machine, substantially as set forth.

2. The combination in a potato-planter, of a fertilizer attachment and supports therefor in the forward part of the machine, means for actuating the fertilizer attachment to deliver the fertilizer to the furrow, a plow in the forward part of the machine in advance of the place of delivery of the fertilizer, and a spreader 11 connected to the support of the plow and coming immediately in the rear of the plow, and a chute for the fertilizer located above the spreader and a chute for the potatoes back of the fertilizer chute and spreader, substantially as set forth.

3. The combination in a potato-planter with a divided pole and a plow, of links pivoted to the forward part of the plow, links pivoted to the divided pole and to the links of the plow, and a spring extending from the divided pole to the pivot of the respective links, the office of which is to assist the driver of the machine in elevating the plow, substantially as set forth.

4. In a potato-planter, the combination with the pole, of a frame secured thereto and extending transversely in the form of a loop, a marker-bar and an adjustable cross-bar connected thereto and means for connecting the marker-bar to the said frame at either side of the potato-planter, substantially as set forth.

5. In a potato-planter, the combination with the pole, of a frame secured thereto and extending transversely in the form of a loop, a marker-bar and an adjustable cross-bar connected thereto and means for connecting the marker-bar to the said frame at either side of the potato-planter, forked lugs having a cross-pin connected to the frame upon opposite sides of the machine and a U-shaped head connected to the end of the marker-bar whereby the marker-bar may be connected to the forked lugs upon either side of the machine and is inserted in the forked lugs in a vertical position and when turned down for use the U-head of the marker-bar is locked in the forked lugs, substantially as set forth.

6. In a potato-planter, the combination with the frame and a plow for opening the furrow, a hopper for potatoes, and means substantially as set forth, for engaging and delivering the potatoes, of a chute rearward of the plow and fastened to the frame of the machine to receive the potatoes as delivered, an adjustable and extensible end to said chute outside of and connected to the main portion of the chute and adapted to reopen the furrow in the soil to the proper depth for the delivery of the potatoes into the ground, substantially as set forth.

7. In a potato-planter, the combination with the plow, a frame for supporting the same pivoted to the main frame of the machine, a hopper for fertilizer and fertilizer-delivery devices supported upon the pole of the machine and a shaft and devices actuating the same for operating the fertilizer devices to deliver the fertilizer, of an automatic spring-actuated clutch upon the shaft of the fertilizer attachment, an arm and cam-faces connected thereto and a rod extending from the arm and a connection therefrom to the frame of the plow whereby when the plow is raised the clutch is disengaged and the fertilizer device rendered automatically inoperative, substantially as set forth.

8. In a potato-planter, the combination with the plow, a frame pivoted to the main frame and supporting the plow and an arm connected to said frame and extending approximately vertical, of pickers and means for mounting the same upon the axle of the driving-wheels, a clutch upon said axle for engaging the support of the pickers and causing their rotation, a sleeve upon the clutch and an arm connected therewith and engaged and operated by the vertical bar on the plow-frame whereby the rotary movement of the pickers is automatically stopped by the raising of the plow or the pickers are brought into action by the lowering of the plow in the operation of the machine, substantially as set forth.

9. In a potato-planter, the combination with a hopper for holding potatoes, of an agitator in the base of the hopper, edge guides formed with the agitator and inclines below the agitator down which the potatoes pass, gates acting in connection with the inclines for checking the flow of the potatoes, and means, substantially as specified, and operating automatically with each rotation of the driving-wheels for controlling the delivery of the potatoes, substantially as set forth.

10. In a potato-planter, the combination with a hopper for holding potatoes, of an agitator in the base of the hopper, edge guides formed with the agitator and inclines below the agitator down which the potatoes pass, gates acting in connection with the inclines for checking the flow of the potatoes, a plow and a frame carrying the same pivoted to the main frame, a support for the gates and means actuated by the raising of the plow for causing the gates and their frame to remain stationary to shut off the delivery of the potatoes, substantially as set forth.

11. In a potato-planter, the combination with a hopper for holding potatoes, of an agitator in the base of the hopper, edge guides formed with the agitator and inclines below the agitator down which the potatoes pass, gates acting in connection with the inclines for checking the flow of the potatoes, a frame pivoted to the main frame of the machine and carrying the said gates, footpieces or wings also supported by said frame and extending downward into the hopper of the machine whereby the flow of potatoes into the hopper automatically raises the said wings or footpieces and the said gates to shut off the supply of potatoes, substantially as set forth.

12. The combination in a potato-planter with a hopper for containing the supply of potatoes, of an agitator in the lower portion of the hopper having edge guides, an incline below the agitator for delivering the potatoes, gates acting in connection with the inclines for controlling the delivery of the potatoes, a frame pivoted to the main frame of the machine and carrying the said gates, the center of the frame coming below the agitator and supporting the same and a cam on the driving-wheel axle adapted to raise and lower the said frame with every revolution of the driving-wheels and thereby raising the agitator, substantially as set forth.

13. In a potato-planter, the combination with a receptacle for potatoes and means for delivering the same therefrom and into the ground, of coverers, a frame to which the same are connected, the said coverers extending downward and rearward of the potato-planter, a spring connected to the main frame and to the coverer-frame and adapted to hold the coverers down and which yields when the coverers pass over inequalities in the ground, substantially as set forth.

14. In a potato-planter, the combination with a receptacle for potatoes and means for delivering the same therefrom and into the ground, of coverers, a frame to which the same are connected, the said coverers extending downward and rearward of the potato-planter, a spring connected to the main frame and to the coverer-frame and adapted to hold the coverers down and which yields when the coverers pass over inequalities in the ground, and a frame connected to the pivoted frame of the coverers and adapted to swing the coverer-frame and raise the coverers, and a means for holding the forward end of said frame down and the coverers elevated, substantially as set forth.

15. In a potato-planter, the combination with a hopper for holding potatoes, means for delivering said potatoes from the hopper and for removing the same and delivering them into the furrow in the ground, of a yoke-frame, pivots for securing the ends of the yoke-frame to the main frame of the machine closely adjacent to the axle of the driving-wheels, coverers connected to the said yoke-frame and extending downward and rearward and converging at their extreme ends toward one another, and a spring connected at one end to the main frame and at the other end to the yoke-frame and adapted to hold the coverers down against the soil, substantially as set forth.

16. In a potato-planter, the combination with a hopper for holding potatoes, means for delivering said potatoes from the hopper and for removing the same and delivering them into the furrow in the ground, of a yoke-frame, pivot-bolts for securing the ends of the yoke-frame to the main frame of the machine closely adjacent to the axle of the driving-wheels, coverers connected to the said yoke-frame and extending downward and rearward and converging at their extreme ends toward one another, and a spring connected at one end to the main frame and at the other end to the yoke-frame and adapted to hold the coverers down against the soil, a foot-lever connected to the yoke-frame and extending forward, a plow and a frame carrying the same and pivoted to the main frame of the machine and a lifter pivoted to the plow-frame and extending upward and having a hooked portion whereby when the plow is elevated by the lifter and the foot-lever is pressed down to elevate the coverers, the said lifter and foot-lever may be connected by the hook of the lifter and both parts locked in an elevated position, substantially as set forth.

17. In a potato-planter, the combination with a hopper for fertilizer and fertilizer-delivery devices and the support therefor, of a shaft extending through the fertilizer-hopper, a sprocket upon the shaft, a sprocket on the shaft of the driving-wheel and a chain connecting the same, cam-faces, means connected thereto for operating the cam-faces with the movements of the plow and frame for throwing the sprocket on the shaft of the fertilizer devices out of gear, and means for again connecting the said sprocket when the cam-faces return to a normal position, substantially as set forth.

18. In a potato-planter, the combination with a hopper for fertilizer and fertilizer-delivery devices, and a support therefor, of a shaft extending through the fertilizer-hopper, a sleeve loose upon said shaft, a sprocket connected to said sleeve and having part of the teeth of the clutch thereon, slide-bars in ways between the clutch and the sleeve, cam-faces, a rod and means for operating the same by the movement of the plow and frame, and spring-actuated parts moved by the said slide-bars with the action of the cam-faces for separating the teeth of the clutch, substantially as set forth.

19. In a potato-planter, the combination with a hopper for fertilizer and fertilizer-delivery devices and the support therefor, of a shaft extending through the fertilizer-hopper, a sleeve loose upon said shaft, a sprocket connected to said sleeve and having part of the teeth of the clutch thereon, slide-bars in ways between the clutch and the sleeve, cam-faces, a rod and means for operating the same by the movement of the plow and frame, a hub 44 having clutch-teeth on one end adapted to engage the teeth of the sprocket, a sleeve and cross-arms 43 secured to the shaft of the fertilizer devices, a spring between the cross-arms 43 and a flange of the hub 44, whereby the movement of the slide-bars longitudinally by the action of the cam-faces separates the teeth of the clutch to stop the movement of the fertilizer devices, and when the cam-faces return to their normal position, the said spring actuates the part to again engage the clutch-teeth, substantially as set forth.

Signed by me this 8th day of December, A. D. 1899.

LEWIS AUGUSTUS ASPINWALL.

Witnesses:
E. L. ROSE,
DANIEL H. PERRY.